United States Patent [19]

Reuter

[11] 4,408,510
[45] Oct. 11, 1983

[54] APPARATUS FOR CUTTING BOARDS FROM TREE TRUNKS

[75] Inventor: Alfred Reuter, Oberkirch, Fed. Rep. of Germany

[73] Assignee: Gebrüder Linck Maschinenfabrik und Eisengiesserei "Gatterlinck", Oberkirch, Fed. Rep. of Germany

[21] Appl. No.: 242,475

[22] Filed: Mar. 11, 1981

[30] Foreign Application Priority Data

May 29, 1980 [DE] Fed. Rep. of Germany ....... 3020321

[51] Int. Cl.³ .......................... B27M 1/08; B25B 7/14
[52] U.S. Cl. ....................................... 83/869; 83/318; 144/3 R; 144/367; 144/378; 144/379
[58] Field of Search ................. 83/318, 319, 861, 869; 144/3 R, 37, 39, 367, 368, 376, 378, 379; 82/53.1

[56] References Cited

U.S. PATENT DOCUMENTS

| | | | |
|---|---|---|---|
| 2,682,307 | 6/1954 | Overman | 83/318 |
| 3,044,336 | 7/1962 | Bock | 83/319 |
| 3,457,978 | 7/1969 | Ahlstedt | 144/378 |
| 3,487,866 | 1/1970 | Mitten | 144/368 |
| 3,738,404 | 6/1973 | Walker | 144/136 R |
| 4,015,648 | 4/1977 | Shepard | 144/1 R |
| 4,324,277 | 4/1982 | Kreibaum | 144/378 |
| 4,335,767 | 6/1982 | Reuter | 144/39 |

Primary Examiner—W. D. Bray
Attorney, Agent, or Firm—Michael J. Striker

[57] ABSTRACT

A method and an apparatus for cutting boards from tree trunks in which transverse cuts are made in a tree trunk which extend into the trunk a predetermined depth and thereafter longitudinal cuts are made into said trunk, which cuts pass through a plane passing through the inner ends of the transversal cuts, whereby the boards are separated from the trunk. The apparatus for cutting boards from tree trunks comprises guide rollers for advancing a trunk in a longitudinal direction, saw units adapted to move in a vertical and in a longitudinal directions to produce the transverse cuts and saw blades movable in the longitudinal direction to produce the longitudinal cuts after the transversal cuts have been made.

9 Claims, 6 Drawing Figures

APPARATUS FOR CUTTING BOARDS FROM TREE TRUNKS

BACKGROUND OF THE INVENTION

The present invention relates to methods and apparatus for treatment of tree trunks to produce an elongated trunk of substantially rectangular crosssection. In the prior art methods of treatment of tree trunks, the effort has been made to use the most possible volume of wood of tree trunks in producing such articles as boards, girders, square timbers or the like where boards are normally removed from the main portion of the trunk so as to produce the trunk of the cross-section where wood of the trunk is utilized in the best possible fashion.

It is to be considered that each tree trunk does not have a uniform cylindrical shape. However, even in the ideal case, the trunks, in their natural condition, normally are slightly tapering towards their ends. Therefore, in almost every case, the trunks have bendings along the length thereof or even shape declinations. These declinations from the cylindrical shape lead to the fact that the lateral edges or boards do not extend straightly and uniformly along the length of the trunk, and particularly in the normal case, in the conically-shaped trunk, the boards extend forward each other as the cross-section of the conically-shaped trunk decreases toward the top of the trunk so that one can observe slopes or rough slabs on the surface of the trunk.

It is therefore desirable to produce cutting of boards from the main portion of the trunk, which will become a final product in the trunk treatment, at the relatively small sections of the elongated trunk. One of the known methods of cutting boards from the trunks is disclosed in the German published application DE-OS No. 2750712. In this method, rotary circular saw blades are utilized which make transversal cuts after the boards or lateral portions have been removed from the trunk. In the disclosed methods, the boards separated from the trunk still lay on the surface of the trunk so that the outer surface of the main portion of the trunk may be damaged by circular blades during producing the above mentioned transversal cuts. In order to avoid this disadvantage a splitting wedge is normally utilized which is placed into a gap between the boards and the main portion of the trunk. At the same time support for clamping previously cut boards on the trunk should be provided during the producing of transversal cuts.

The necessity of utilizing of a splitting wedge to be inserted between the boards and the trunk leads to considerably high manufacturing expenses. Furthermore, friction which occurs when the splitting wedge is placed into the aforementioned gap prevents the trunk from the required relatively fast advancing movement in the lengthwise direction, so that at one hand, the advancing speed of the trunk is limited by that friction and at the other hand, there is no sufficient available time to produce as many transversal cuts as desirable. More transversal cuts, are, however desirable when the portion of the trunk having slopes and rough slabs to be cut off is relatively long and some additional transversal cuts may be therefore required for subsequent separation of the slabs from the wood to be used to obtain the desirable shape of the trunk.

It has been therefore found desirable to provide such a method of cutting boards from tree trunks where the transversal cuts could be produced quickly and without additional guiding and/or clamping of the boards on the body of the trunk during making of the transversal cuts.

The trunks to be placed into the apparatus for cutting the boards are sometimes preliminary premachined so that they are formed with substantially rectangular cross section and have four substantially rectangular cutouts produced at each corner of the trunk. These cutouts are normally milled out from the trunk beofre boards are separated from the main portion of the trunk. Such method of premachining of trunks is disclosed, for example in the German patent application No. P 29 28949.4 which discloses sawing one of two angularly adjacent surfaces and removing residual material in in form of wood clips by milling, whereupon the next following saw cut is made along the other of the two surfaces.

With this method the boards obtained are limited at all sides thereof by saw cut, but they still have to be sorted and trimmed at their ends where portions of the bark area remain. The necessity for these additional operating steps is evidently undesirable.

SUMMARY OF THE INVENTION

It is therefore an object of the invention to provide a method and an apparatus for cutting boards from tree trunks which avoid the aforementioned drawbacks encountered in the prior art.

Another object of the invention is to provide an improved method of cutting boards from the trunks which is simple and efficient.

Still another object of the invention is to provide an improved apparatus for cutting boards from tree trunks which is reliable in operation and which can be readily adjusted for different sizes of tree trunks being treated.

These and other objects of the invention are attained by a method of cutting boards from tree trunks comprising the steps of making transverse cuts into a tree trunk to a predetermined depth, and thereafter making longitudinal cuts into the tree trunk in a plane passing the inner ends of the transverse cuts so as to separate the boards from the trunk.

The trunk may be continuously advanced in a longitudinal direction.

The trunk may be formed so that four substantially rectangular portions with substantially flat edges are milled out from the trunk at each corner thereof. This trunk will have a main portion and two lateral portions extending outwardly from said main portion. The aforementioned predetermined depth of the transversal cuts will be substantially equal to the thickness of each of said lateral portions.

The transversal cuts may be made at a predetermined distance from each other along the length of the trunk.

The rectangular portions may be milled out from the trunk before the transversal cuts are made.

Alternatively, the rectangular portions may be milled out from the trunk after the transversal cuts have been made.

The objects of the invention are also attained by an apparatus for cutting boards from tree trunks, comprising means for making transversal cuts into a tree trunk to a predetermined depth and means for making longitudinal cuts in the tree trunk in a plane passing through the inner ends of said transversal cuts to separate the boards from the trunk.

The apparatus may further include means for continuously advancing movement of the tree trunk in a longitudinal direction.

The means for making transversal cuts may include a pair of saw units positioned at two opposite sides of the trunk and each carrying a rotary saw, which saw units are arranged to move in the longitudinal direction with a speed corresponding to a speed of said advancing movement and in the transversal direction to produce said transversal cuts in the trunk.

The means for making longitudinal cuts may include at least two sets of saw blades, which saw blades in each set are so arranged as to move through the aforementioned plane to produce the longitudinal cuts.

The sets of the saw blades may be spaced from each other at a predetermined distance corresponding to the final width of the trunk.

The apparatus may further comprise means for moving the saw units in the longitudinal direction, which means include a pair of rails and a pair of carriages each adapted to move along the respectve rail.

The apparatus may further include means for mving the saw units in the transversal direction includin guide rails, said saw units being adapted to move along aid guide rails.

The apparatus may further comprise first drive means operatively connected to the saw unit for the movement thereof in the longitudinal direction.

The apparatus may be provided with second drive means operatively connected to the saw units for the movement thereof back and forth in a vertical direction.

The means for continuous advancing movement of the trunk may include a plurality of guide rollers positioned at the opposite sides of the trunk and along the length thereof.

The rotary saws of said saw units may be circular.

In the method of the invention, the transversal cuts on the body of the trunk are produced before boards are separated from the trunk by means of longitudinal cuts. The boards or lateral portions treated in the fashion provided by the method of the invention are subdivided into portions when they are not yet removed from the main portion of the trunk. Therefore, in the proposed method, there is no need for special additional supporting or clamping of the boards on the trunk. It is possible to move the trunks without provision of exact guiding of the same since the cut depth due to insertion of the blades producing the transversal cuts into the trunk is exactly set up and thus ensured, so that the transversal cuts extend into a tree trunk a predetermined distance and longitudinal cuts made thereafter extend through a plane passing through the inner ends of the transversal cuts. In this instance, the damage to the outer surface of the main portion which may be done by the transversal cuts is prevented.

Means for producing transversal cuts in the apparatus of the invention are movable along the length of the trunk between the positions where individual transversal cuts are produced. When these means are moved out of contact with the trunk being treated this movement may be accelerated and performed without producing any friction to the trunk. It is therefore possible to perform the cutting with relatively high speeds of advancing movement of the trunk and to provide more transversal cuts if desirable, for example at the portion of the trunk where the rough slabs have to be separated from the trunk.

When the transversal cuts are produced after the premilled cutouts have been made at the trunk corners it is required that an operator or specially installed reliable optical pickup arrangement be utilized to indicate places where the transversal cuts are to be made. Altenatively, it is possible that the transversal cuts may be made before the premilled cuts at the corners of the trunk are produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
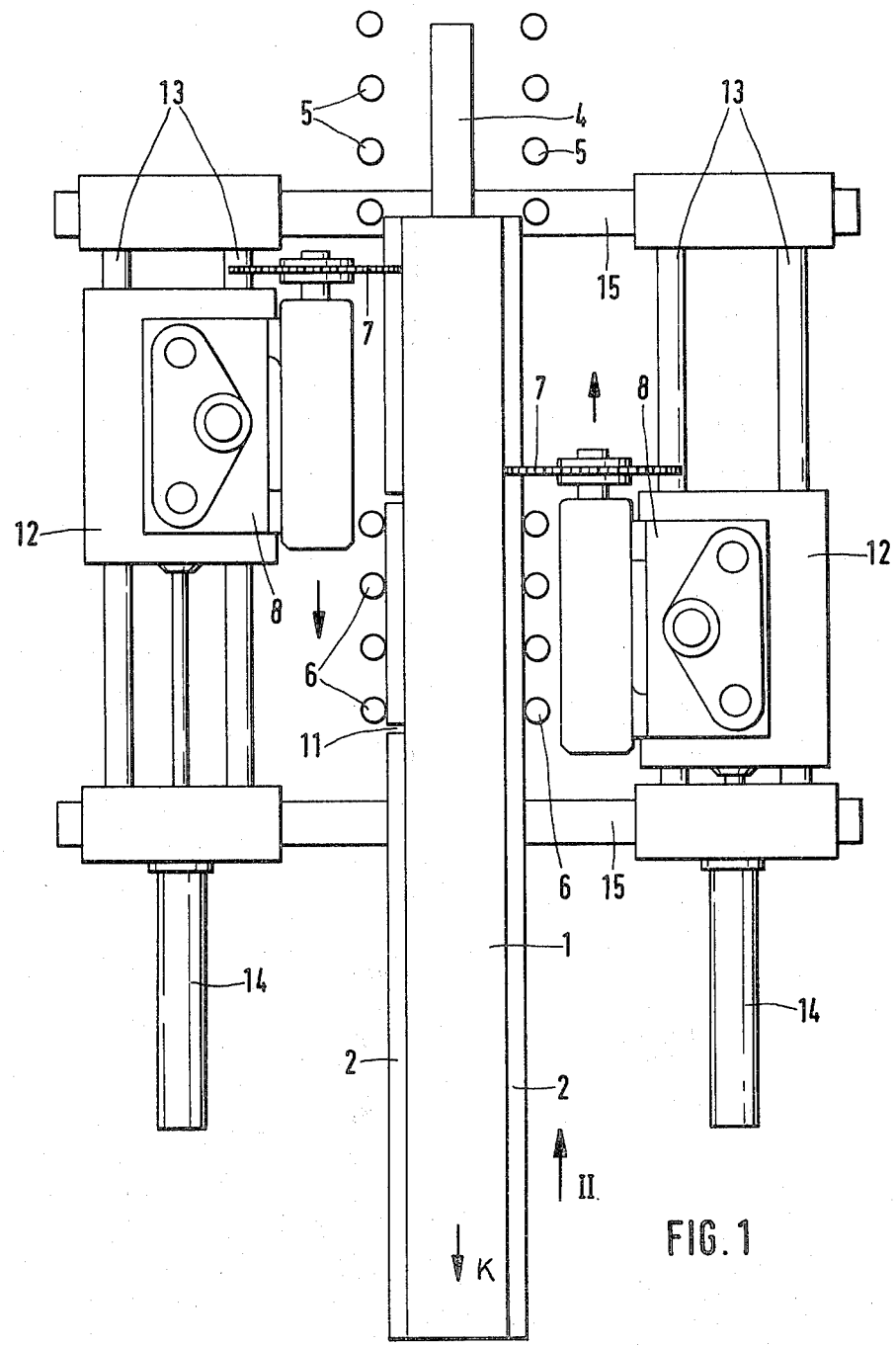
FIG. 1 is a top plan view of an apparatus for cutting boards from tree trunks according to the invention.
Figure 2:
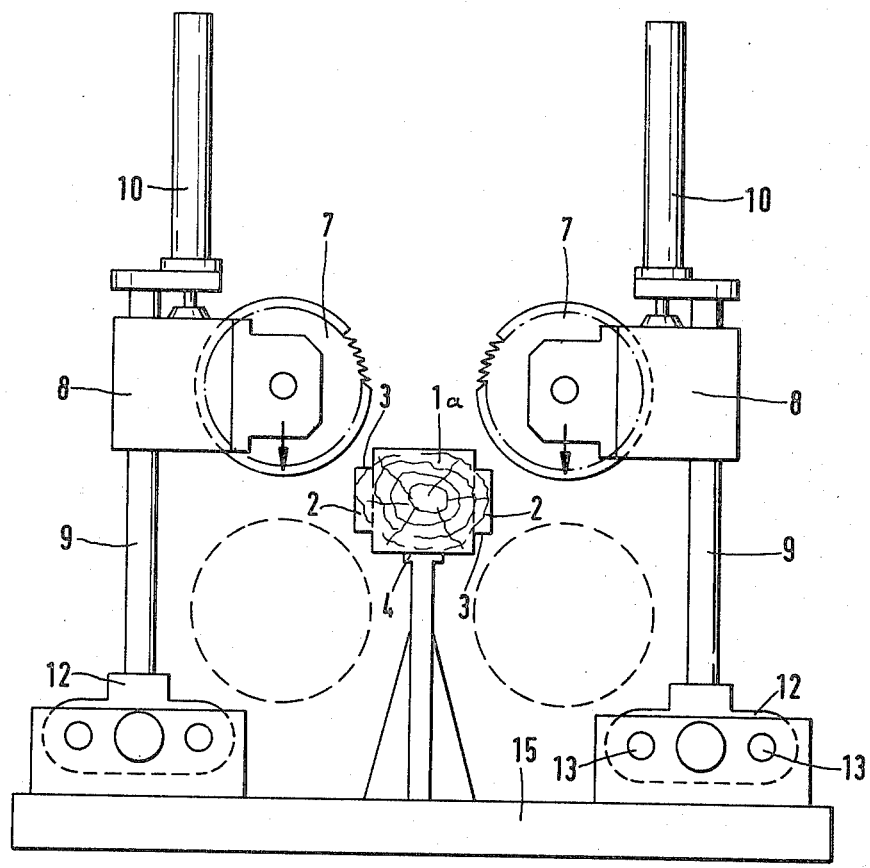
FIG. 2 is a front view of the apparatus illustrated in the direction shown by arrow II in FIG. 1.

Referring to the drawings, FIGS. 1 and 2 illustrate an apparatus for cutting boards from a tree trunk denoted as 1. The tree trunk subjected to treatment in the apparatus of the invention has a form clearly shown in FIG. 2. The trunk 1 may be preliminary premachined so that it has a main portion 1a of substantially rectangular shape and two boards or lateral portions 2 extending laterally from the main portion 1a and formed by four premilled cutouts 3 provided at each corner of the trunk. The trunk in such a premachined form is placed on a supporting member 4 and is moved between guide rollers 5 positioned at the opposite sides of the member 4 in the longitudinal direction shown by arrow K. Guide rollers 6 are also provided in the apparatus for lateral supporting and further advancing of the trunk.

Figure 3:
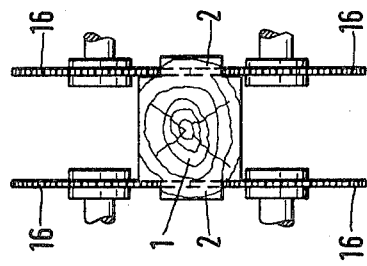
FIG. 3 is a side view of the free trunk being treated with transversal cuts made thereon.

Two saw units 8 are mounted between guide rollers 5 and 6, which units each carries a circular saw 7 adapted to perform a cut in the transversal direction. The saw units 8 are positioned at the opposite sides of the trunk and include drive means for the circular saws 7. The saw units 8 are respectively mounted on two posts 9 each of which has a rounded shape and serves as a guide rail for the unit 8 when the latter is moved back and forth in the vertical direction. This vertical movement is attained by means of oil-pressure-operative plunger-cylinder units 10 advancing the units 8 along the respective posts 9 toward the trunk when the saws 7 are in their respective positions to produce the transversal cuts 11 (as shown in FIG. 3).

Each of the posts 9 is securely mounted in a respective sliding carriage 12 which is provided with bores receiving rails 13 which extend lengthwise to the trunk being treated. The carriages 12 together with the saw units 8 are thus moved in the longitudinal direction along the rails 13 by means of oil-pressure-operative plunger-cylinder units 14 towards or from the positions where the transversal cuts are to be made.

A control arrangement (not shown) is provided in the apparatus to control the respective movements of the plunger-cylinder units 10 and 14 in dependence from the speed of advancing movement of the trunk 1 in the longitudinal direction in such a fashion that the units 8 are moved in the longitudinal direction synchronously with the trunk while the saws 7 produce the transversal cuts 11. This position of the saw unit 8 is shown in the left side of FIG. 1. When the saws 7 are moved out of contact with the trunk 1 after the transversal cut 11 has been produced the plunger-cylinder units 14 move the units 8 back in the direction opposite to the advancing movement until they reach a position for the next transversal cut to be made. This position is shown in the right side of FIG. 1.

Guide rails 15 are provided in the apparatus for moving the saw units 8 in the transversal direction towards and away from the trunk 1.

The transversal cuts 11 produced by saws 7 may be clearly seen in FIG. 3. These cuts are made at substantially equal distance one from another along the length of the trunk in order to facilitate the removal of the lateral portions 2 from the main portion 1a of the trunk. As is shown in FIG. 3, the depth of transversal cuts 11 is substantially equal to the thickness of the lateral portions 2 of the trunk. The positions of the saws 7 producing the transversal cuts are adjusted so that the surface of the final product or rectangularly-shaped trunk will not be deteriorated by contact with these saws while the transversal cuts 11 are made.

Figure 4:
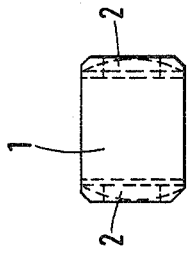
FIG. 4 is a sectional view taken along line IV—IV of FIG. 3.

FIGS. 3 and 4 illustrate saw blades 16 which are provided in the apparatus for producing longitudinal cuts to remove boards or lateral portions 2 from the main portion of the trunk. In the embodiment shown in FIGS. 3 and 4, the tree trunk 1 is shown which has been provided with four premilled rectangular cutouts 3 before the transversal cuts 11 were made. The saw blades 16 are arranged in two sets, each set being positioned in a plane passing through the ends of transversal cuts 11. Two saw blades 16 in each set extend toward each other. The saw blades 16 are moved in the longitudinal direction to remove boards 2 from the trunk which were previously subdivided into discrete portions by transversal cuts 11. The reference numerals 21 indicate the portions of rough slabs or sloped boards on the surface of the trunk which should be removed from the trunk by additional transversal and longitudinal cuts to be made along the length of the trunk.

Figure 5:
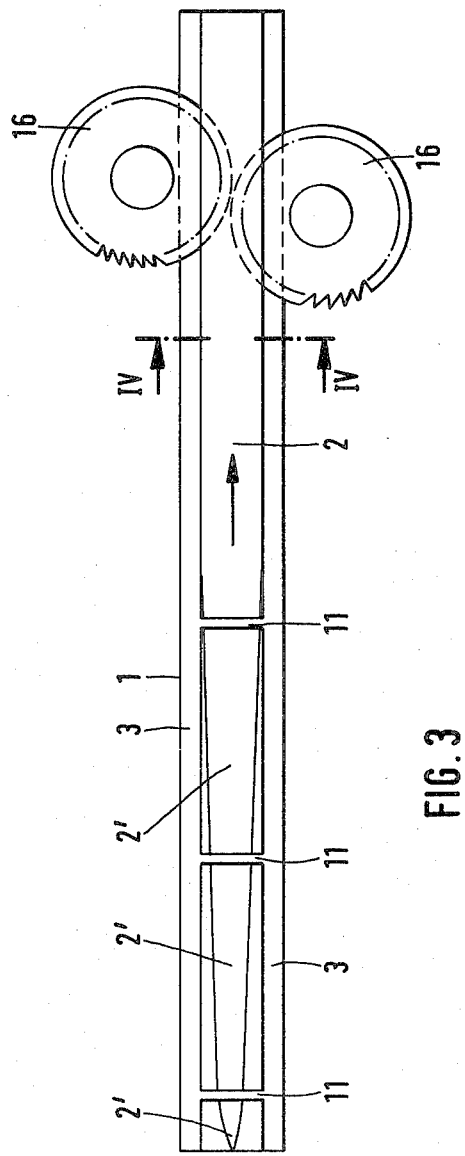
FIG. 5 is a side view of the tree trunk being treated illustrating a modification of a method of cutting boards from tree trunks according to the invention.
Figure 6:
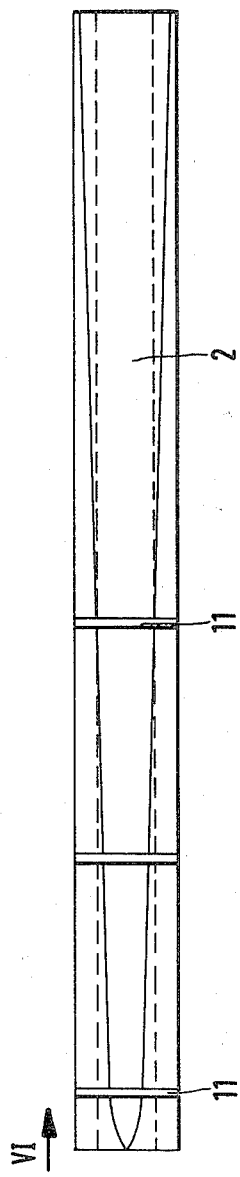
FIG. 6 is a front view of the trunk shown in the direction of arrow IV indicated in FIG. 5.

FIGS. 5 and 6 illustrate a modification of a method of cutting boards from a tree trunk. In this modification, the transversal cuts are produced on the trunk before the rectangular cuts at each corner of the trunk are made which cuts form lateral portions 2 subjected to further removal.

Instead of the provision of the apparatus with plunger-cylinder units 14 shown in FIGS. 1 and 2 and used for longitudinal movement of the units 8, the carriages 12 may be operatively connected to the drive means utilized in this apparatus for advancing movement of the trunk.

It will be understood that each of the elements described above, or two or more together, may also find a useful application in other types of method of cutting boards from tree trunks differing from the types described above.

While the invention has been illustrated and described as embodied in a method of cutting boards, it is not intended to be limited to the details shown, since various modifications and structural changes may be made without departing in any way from the spirit of the present invention.

Without further analysis, the foregoing will so filly reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for cutting boards from tree trunks, comprising means for making transversal cuts into a tree trunk to a predetermined depth; means for making longitudinal cuts into the tree trunk in a plane passing through the inner ends of said transversal cuts whereby the boards are separated from the trunk; and means for continuous advancing movement of the tree trunk in the longitudinal direction, said means for making transversal cuts including a pair of saw units positioned at two opposite sides of said trunk and each carrying a rotary saw, said saw units being arranged to move in said longitudinal direction with a speed corresponding to a speed of said advancing movement and in the transversal direction to produce said transversal cuts in said trunk.

2. The apparatus of claim 1, wherein said means for making longitudinal cuts include at least two sets of saw blades, said saw blades in each of said sets being so arranged that they move through said plane to produce said longitudinal cuts.

3. The apparatus of claim 2, wherein said sets of said saw blades are spaced from each other at a predetermined distance corresponding to the final width of said trunk.

4. The apparatus of claim 3, further including means for moving said saw units in the longitudinal direction including a pair of rails and a pair of carriages each adapted to move along the respective rail.

5. The apparatus of claim 4, further including means for moving said saw units in the transverse direction including guide rails, said saw units being adapted to move along said guide rails.

6. The apparatus of claim 5, further including first drive means operatively connected to said saw units for the movement thereof in said longitudinal direction.

7. The apparatus of claim 6, further including second drive means operatively connected to said saw units for the movement thereof back and forth in a vertical direction.

8. The apparatus of claim 7, wherein said means for continuous advancing movement of the tree trunk include a plurality of guide rollers positioned at the opposite sides of the trunk and along the length thereof.

9. The apparatus of claim 8, wherein said saws are circular.

* * * * *